(12) United States Patent
Koulomzin

(10) Patent No.: US 8,892,647 B1
(45) Date of Patent: Nov. 18, 2014

(54) SYSTEM AND METHOD FOR ASSOCIATING A COOKIE WITH A DEVICE IDENTIFIER

(75) Inventor: Daniel Koulomzin, Jamaica Plain, MA (US)

(73) Assignee: Google Inc., Mountain View, CA (US)

( * ) Notice: Subject to any disclaimer, the term of this patent is extended or adjusted under 35 U.S.C. 154(b) by 345 days.

(21) Appl. No.: 13/158,891

(22) Filed: Jun. 13, 2011

(51) Int. Cl.
 G06F 15/16 (2006.01)
 G06F 15/173 (2006.01)
 H04L 29/06 (2006.01)
 H04L 29/08 (2006.01)

(52) U.S. Cl.
 CPC ........... *H04L 63/0876* (2013.01); *H04L 67/146* (2013.01); *H04L 63/14* (2013.01)
 USPC .......................................... 709/204; 709/225

(58) Field of Classification Search
 CPC ...... H04L 63/08–63/10; H04L 63/14–63/1425
 USPC .................. 709/203–204, 223–226; 726/2–5, 726/26–30
 See application file for complete search history.

(56) References Cited

U.S. PATENT DOCUMENTS

| | | | | |
|---|---|---|---|---|
| 7,310,733 B1* | 12/2007 | Pearson et al. | ................ | 713/185 |
| 7,606,918 B2* | 10/2009 | Holzman et al. | ............... | 709/229 |
| 7,797,548 B2* | 9/2010 | Pearson et al. | ................ | 713/185 |
| 2005/0066043 A1* | 3/2005 | Wallman | ....................... | 709/229 |
| 2006/0114863 A1* | 6/2006 | Sanzgiri et al. | ................ | 370/338 |
| 2009/0006861 A1* | 1/2009 | Bemmel | ....................... | 713/189 |
| 2009/0077163 A1* | 3/2009 | Ertugrul et al. | ............... | 709/203 |
| 2010/0031332 A1* | 2/2010 | Mason | ............................. | 726/6 |
| 2010/0223471 A1* | 9/2010 | Fresko et al. | ................. | 713/176 |
| 2012/0265703 A1* | 10/2012 | Basra et al. | .................... | 705/319 |

\* cited by examiner

*Primary Examiner* — Joshua Joo
(74) *Attorney, Agent, or Firm* — Patent Law Works LLP

(57) ABSTRACT

A system and method for cookie association is disclosed. The system is communicatively coupled to a client via a network. The client has a first user and a second user. The system receives a first set of login information for the first user from the client. The first set of login information is for the first user. The system determines a first user identifier for the first user and a device identifier. The system associates the device identifier with the first user identifier. The system determines a cookie that includes a device identifier. The system receives logout information for the first user, and disassociates the device identifier from the first user identifier. The system receives a second set of login information for the second user from the client. The system associates a second user identifier with the device identifier.

20 Claims, 7 Drawing Sheets

SYSTEM AND METHOD FOR ASSOCIATING A COOKIE WITH A DEVICE IDENTIFIER

BACKGROUND

The specification relates to a system and method for authenticating online communications. In particular, the specification relates to attaching a cookie to a client device.

Users of internet services (e.g., email, microblogs, social networks, etc.) frequently have multiple online identities. Many users prefer to have a fewer number of identities and have a single entity manage their online identities. OpenID™ providers are user identity management services that manage the online identity of users and authenticate these users to third-party internet service providers. These third parties are referred to as relying parties because they trust the OpenID™ provider to authenticate users for them. A user logs in with the user identity management service and is thereafter automatically logged in to many other relying parity services. For example, the user has an email account, a microblog account and a social network account. The user logs in to the user identity management service and is automatically logged in to the email account, microblog account and social network account when the user visits the websites that provide these services.

A problem present in user identity management services is that when a user logs out of one relying party service they are not logged out globally from all the other services. For example, the user is logged in to the user identity management service. The user has an email account, a microblog account and a social network account. The user visits a microblog service and is automatically logged in. The user logs out of the microblog service, and expects to be logged out of the email account and the social network account. However, since the microblog service does not communicate this log out event to the email service and the social network service, the user may not be logged out of these services.

SUMMARY OF THE INVENTION

The technology described in the specification overcomes the deficiencies and limitations of the prior art at least in part by providing a system and method for associating a cookie. The system is communicatively coupled to a client via a network. The client has a first user and a second user. The system receives a first set of login information for the first user from the client. The first set of login information is for the first user. The system determines a first user identifier for the first user and a device identifier for the client. The system determines a cookie and associates the device identifier with the first user identifier. The cookie is issued to the client and stored on the client. The system receives logout information for the first user, and disassociates the device identifier from the first user identifier. The system receives a second set of login information for the second user from the client. The system associates a second user identifier with the same device identifier.

In one embodiment, the specification includes a computer program product for cookie association comprising a non-transitory computer readable medium storing a computer readable program, wherein the computer readable program when executed on a computer causes the computer to perform steps. In another embodiment, the specification includes a method for associating a first user identifier with a device identifier, receiving logout information from a client for the first user identifier, disassociating the first user identifier from the device identifier stored on the client and associating a second user identifier with the device identifier stored on the client.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
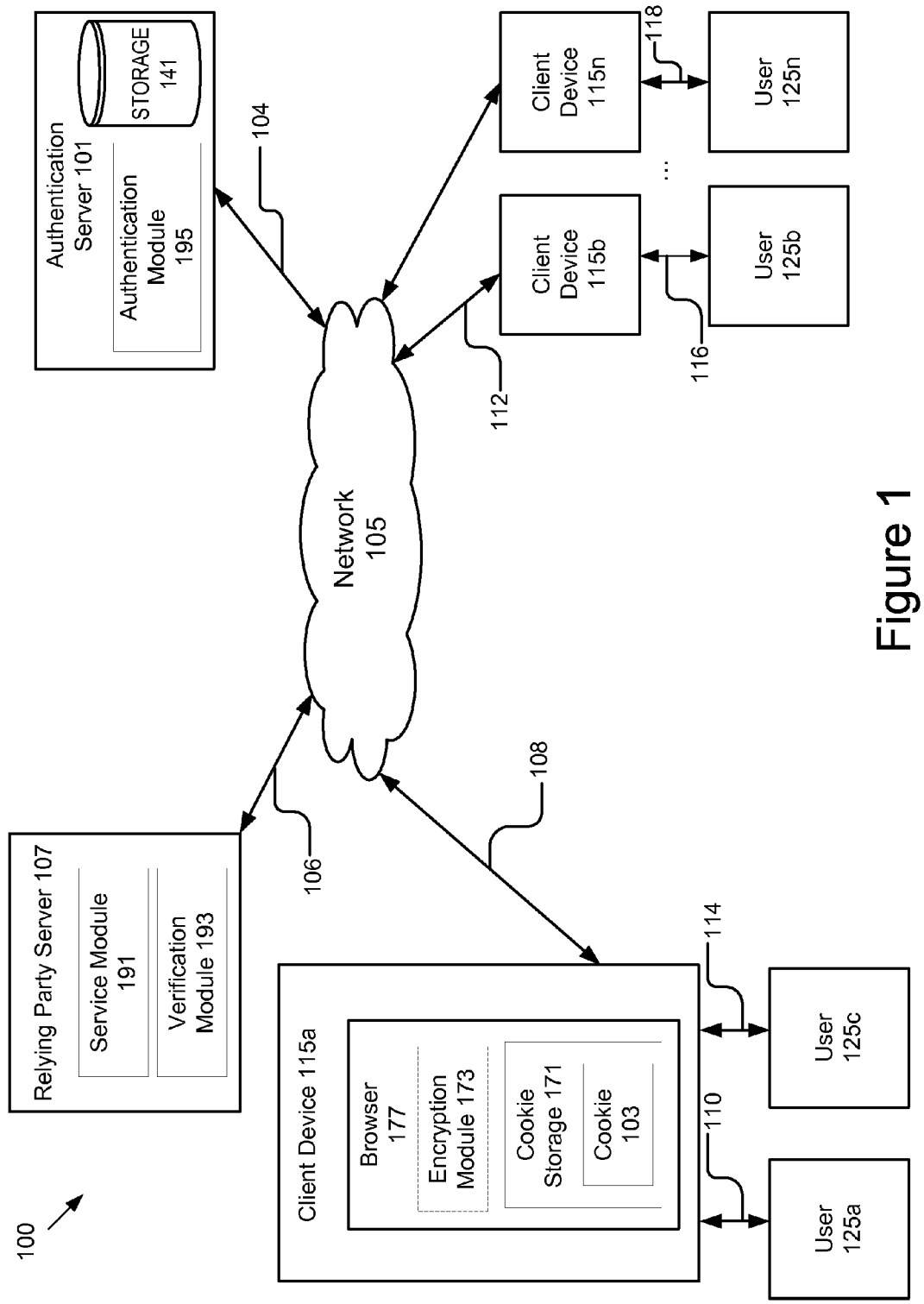
FIG. 1 is a high-level block diagram illustrating one embodiment of a system for authenticating a user with a cookie.

A system and method for cookie association is described below. In the following description, for purposes of explanation, numerous specific details are set forth in order to provide a thorough understanding of the specification. It will be apparent, however, to one skilled in the art that the specification can be practiced without these specific details. In other instances, structures and devices are shown in block diagram form in order to avoid obscuring the specification. For example, the disclosure is described in one embodiment below with reference to user interfaces and particular hardware. However, the specification applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the specification can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the disclosure as described herein.

System Overview

FIG. 1 illustrates a block diagram of a system 100 for authenticating a user 125a, 125b, 125c, 125n with a cookie 103 according to one embodiment. The system 100 includes client devices 115a, 115b, 115n that are accessed by users 125a, 125b, 125c, 125n, an authentication server 101 and a relying party server 107. In the illustrated embodiment, these entities are communicatively coupled via a network 105. Although only three client devices 115a, 115b, 115n are illustrated, persons having ordinary skill in the art will recognize that any number of client devices 115n are available to any number of users 125n. Persons having ordinary skill in the art will also appreciate that any number of users 125n can use (or access) a single client device 115n. Herein, the user 125a is referred to as a first user of the client device 115a and the user 125c is referred to as a second user of the client device 115a. While only one network 105 is coupled to the client devices 115a, 115b, 115n, the authentication server 101 and the relying party server 107, in practice any number of networks 105 can be connected to the client devices 115a, 115b, 115n, the authentication server 101 and the relying party server 107. Persons having ordinary skill in the art will also appreciate that while only one authentication server 101 and one relying party server 107 are depicted in FIG. 1, the system 100 could include one or more authentication servers 101 and one or more relying party servers 107.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In one embodiment, the network 105 may be a peer-to-peer network. The network 105 may also be coupled to or includes portions of a telecommunications network for sending data in a variety of different communication protocols. For example, the network is a 3G network or a 4G network. In another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In the illustrated embodiment, the client device 115a is communicatively coupled to the network 105 via signal line 108. The first user 125a interacts with the client device 115a as represented by signal line 110 and the second user 125c interacts with the client device 115a as represented by the signal line 114. Similarly, the client device 115b is coupled to the network 105 via signal line 112. Client device 115n and user 125n are coupled and interact in a similar manner. The user 125b interacts with the client device 115b as represented by signal line 116 and the user 125n interacts with the client device 115n as represented by signal line 118. The relying party server 107 is communicatively coupled to the network 105 via signal line 106. The authentication server 101 is communicatively coupled to the network 105 via signal line 104.

The authentication server 101 is a hardware server device. For example, the authentication server 101 is a hardware server operated by Google® of Mountain View, Calif. The authentication server 101 maintains the online identity for the users 125a, 125b, 125c, 125n of the client devices 115a, 115b, 115*n*. The authentication server 101 authenticates the users 125*a*, 125*b*, 125*c*, 125*n* to the relying party server 107. For example, the authentication server 101 is a hardware server that provides the Google® FriendConnect service to the relying party server 107 and the client device 115*a*, 115*b*, 115*n*. In one embodiment, the authentication server 101 is an OpenID® provider that authenticates and maintains the online identity for the users 125*a*, 125*b*, 125*c*, 125*n* of the client devices 115*a*, 115*b*, 115*n*. Persons having skill in the art will recognize that the Google® FriendConnect service can be configured as an OpenID® provider that authenticates and maintains the online identity for the users 125*a*, 125*b*, 125*c*, 125*n* of the client devices 115*a*, 115*b*, 115*n*. In one embodiment, the authentication server 101 only authenticates the user 125*a*, 125*b*, 125*c*, 125*n* to the relying party server 107 if the authentication server 101 has received permission to do so. In another embodiment, identifying information describing the user 125*a*, 125*b*, 125*c*, 125*n* is anonymized when stored on the authentication server 101.

The authentication server 101 sends data to and receives data from one or more of the client devices 115*a*, 115*b*, 115*n* via the network 105. For example, the first user 125*a* of the client device 115*a* uses a browser 177 stored on the client device 115*a* to register an account with the authentication server 101, login to the authentication server 101 and logout of the authentication server 101. In one embodiment, identifying information describing the user 125*a*, 125*b*, 125*c*, 125*n* received by the authentication server 101 when a user 125*a*, 125*b*, 125*c*, 125*n* registers an account with the authentication server 101 is anonymized when stored on the authentication server 101. Additional communications between the client devices 115*a*, 115*b*, 115*n* and the authentication server 101 are described in more detail below with reference to FIGS. 4, 5, 6A and 6B.

The authentication server 101 also sends data to and receives from the relying party server 107. These communications are also described in more detail below with reference to FIGS. 4, 5, 6A and 6B.

In one embodiment, the authentication server 101 is a device that is trusted by the user 125*a*, 125*b*, 125*c*, 125*n* of the client device 115*a*, 115*b*, 115*n*. For example, the user 125*a*, 125*b*, 125*c*, 125*n* of the client device 115*a*, 115*b*, 115*n* shares data and/or other information about the user 125*a*, 125*b*, 125*c*, 125*n* and/or the client device 115*a*, 115*b*, 115*n* with the authentication server 101 and the authentication server 101 anonymizes this data and/or information and keeps this data and/or information secret from third parties.

In one embodiment, the authentication server 101 comprises, among other things, a storage device 141 and an authentication module 195. The storage device 141 is a non-transitory memory that stores data such as one or more cookies, user login information and user identifiers associated with the user login information. In another embodiment the authentication server 101 additionally comprises a processor (not pictured) and other components conventional to a hardware server device.

The authentication module 195 is code and routines that, when executed by a processor (not pictured), manages the online identities of the users 125*a*, 125*b*, 125*c*, 125*n* and authenticates the users 125*a*, 125*b*, 125*c*, 125*n* to the relying party server 107. The authentication module 195 also generates a website hosted by the authentication server 101 that provides a webpage and a user interface accessible by the users 125*a*, 125*b*, 125*c*, 125*n*. In one embodiment, the authentication module 195 includes code and routines for anonymizing identifying information about the user 125*a*, 125*b*, 125*c*, 125*n*.

The authentication module 195 communicates with the browser 177 stored on the client device 115*a*, 115*b*, 115*n*. In one embodiment, the authentication module 195 receives a first set of login information from the browser 177 and sends a cookie 103 to the browser 177. For example, the first user 125*a* is a first user of the client device 115*a*. The first user 125*a* provides one or more inputs to the browser 177 using an input peripheral (e.g., a keyboard, a mouse, voice commands to a microphone, etc.). The one or more inputs include at least a portion of a first set of login information. The browser 177 communicates with the authentication module 195 via the network 105 to send the first set of login information to the authentication module 195. In one embodiment, the browser 177 includes in the first set of login information an indication about whether the client 115*a* currently has a cookie 103 stored on the client device 115*a*. In this example, the client 115*a* does not currently have a cookie 103 stored in the client device 115*a*.

The authentication module 195 stores a first association between the first user 125*a* of the client 115*a* and a device identifier. At this point, the cookie 103 is stored on the authentication server 101 (e.g., the cookie 103 is stored in the storage 141 at the time the first association is stored to the storage 141). The cookie 103 is encrypted using secret encryption keys to protect information stored within the cookie and to prevent malicious parties from forging cookies, since without the secret keys, the malicious parties cannot encrypt cookies. The authentication module 195 communicates with the browser 177 to send the cookie 103 to the browser 177 via the network 105. The browser 177 stores the cookie 103 in a cookie storage 171. The cookie storage 171 is a non-transitory memory in the browser 177.

After a first period of time the first user 125*a* provides one or more inputs to the browser 177 indicating that the first user 125*a* logs out (i.e., a logout event). For example, the first user 125*a* uses a peripheral to provide one or more inputs to the browser 177 indicating that the first user 125*a* logs out. The browser 177 communicates with the authentication module 195 to signal the logout event. Responsive to the logout event, the authentication module 195 disassociates the first user 125*a* from the device identifier.

After a second period of time the authentication module 195 receives a second set of login information for a second user 125*c* of the client device 115*a*. For example, the second user 125*c* provides inputs to the browser 177 that includes at least a portion of a second set of login information. The browser 177 communicates with the authentication module 195 to send the second set of login information to the authentication module 195 via the network 105. In one embodiment, the browser 177 includes in the second set of login information an indication about whether the client 115*a* currently has a cookie 103 stored on the client device 115*a*. For example, at this point the cookie 103 is currently stored in the cookie storage 171 and the browser 177 includes information in the second set of login information (e.g., one or more bits of data) indicating that the cookie 103 is currently stored on the client device 115*a*.

The authentication module 195 receives the second set of login information and stores a second association between the second user 125*c* of the client 115*a* and the device identifier. The authentication module 195 uses a different cookie for the first association and the second association but each cookie contains the same device identifier. The authentication module 195 is configured for additional communications with the browser 177. These additional communications are described in more detail below with reference to FIG. 4 (signals 408, 412, 414, 418, 420).

The authentication module 195 also communicates with the verification module 193 stored on the relying party server 107 to authenticate the user 125a, 125b, 125c, 125n of the client 115a, 115b, 115n to the relying party server 107. The processes of the authentication module 195 authenticating the user 125a, 125b, 125c, 125n of the client 115a, 115b, 115n to the relying party server 107 are described in more detail with reference to FIGS. 4, 5, 6A and 6B. The authentication module 195 is stored on a non-transitory memory (not pictured) associated with the authentication server 101.

The storage device 141 is a non-transitory memory. The storage device 141 stores data necessary for the functionality of the authentication module 195. For example, the storage device 141 stores: registration information for one or more clients 115a, 115b 115n and one or more relying party servers 107; login information for one or more clients 115a, 115b, 115n; a cookie 103; and data describing one or more associations between one or more user identifiers of the clients 115a, 115b, 115n and the device identifiers. The authentication module 195 is communicatively coupled to store data on the storage device 141 and retrieve data stored on the storage device 141.

The relying party server 107 is a hardware server device. The relying party server 107 comprises a service module 191 and a verification module 193. The relying party server 107 hosts a website accessible by the client device 115a, 115b, 115n. The website is represented in FIG. 1 by the service module 191.

The service module 191 is code and routines that, when executed by a processor (not pictured), generates the website. In one embodiment, the website provides a service (e.g., web content) via a web page that is part of the website hosted by relying party server 107. For example, the service module 191 includes code and routines for providing a microblog, social network or email service. The service module 191 is stored on a non-transitory memory (not pictured) associated with the relying party server 107. The website hosted by the relying party server 107 is registered with the authentication server 101. In one embodiment, the authentication module 195 provides the website with an authentication service that authenticates users 125a, 125b, 125c, 125n of the client devices 115a, 115b, 115n to the website. The authentication of the users 125a, 125b, 125c, 125n to the website is described in more detail with reference to FIGS. 4, 5, 6A and 6B. In one embodiment there are multiple relying party servers 107 and each relying party server 107 receives a unique cookie, each cookie identifying the same device.

The verification module 193 is code and routines that, when executed by a processor (not pictured), communicates with the authentication module 195 to authenticate the users 125a, 125b, 125c, 125n of the client devices 115a, 115b, 115n to the website hosted by the relying party server 107. For example, a user 125a, 125b, 125c, 125n accesses the first website hosted by the relying party server 107 and the verification module 193 redirects the user 125a, 125b, 125c, 125n to a login page of a second website hosted by the authentication server 101. The user 125a, 125b, 125c, 125n enters information to login (e.g., a user name and password) to the authentication server 101 using the browser 177. The information entered by the user 125a, 125b, 125c, 125n is at least a portion of the login information. In one embodiment, the browser 177 adds information to the information provided by the user 125a, 125b, 125c, 125n to indicate to the authentication server 101 whether the client 115a, 115b, 115n currently stores a cookie 103. The login information includes the information entered by the user 125a, 125b, 125c, 125n and any information added by the browser 177. The authentication module 195 compares the login information to data stored on the storage device 141 to determine if the user 125a, 125b, 125c, 125n has entered valid login information. If the user 125a, 125b, 125c, 125n has entered valid login information, the authentication module 195 communicates this event (referred to as a "valid login event") to the verification module 193, thereby authenticating the user 125a, 125b, 125c, 125n to the relying party server 107. The verification module 193 is stored on a non-transitory memory (not pictured) associated with the relying party server 107.

In one embodiment, the verification module 193 is a plug-in stored on a non-transitory memory associated with the relying party server 107. In one embodiment, the plug-in (represented by verification module 193) provides a service without needing an independent application to be launched, but instead is run in an environment that manages multiple plug-ins. For example, the plug-in is a gadget such as a Google® Gadget. A Google® Gadget is dynamic web content that is embedded in a web page. The first website hosted by the relying party server 107 is registered with the authentication server 101 and the authentication server 101 provides the first website with access to different services, including an authentication service provided by the authentication module 195. For example, the first website (represented by the service module 191) and the first user 125a are registered with Google® Friend Connect (represented in this example by authentication server 101) and Google® Friend Connect provides the first website with access to the authentication service provided by the authentication module 195. The first website is accessed by the client device 115a and the processor-based execution of the plug-in 193 causes the relying party server 107 to redirect the client device 115a to a login page of a second website hosted by the authentication server 101. The authentication server 101 requests data and/or information about the client device 115a and takes steps to authenticate the user 125a of the client device 115a to the relying party server 107. These steps are described in more detail with reference to FIGS. 4, 5, 6A and 6B.

In one embodiment, the relying party server 107 is a device that is not trusted by the users 125a, 125b, 125c, 125n of the client devices 115a, 115b, 115n. For example, the users 125a, 125b, 125c, 125n of the client devices 115a, 115b, 115n have not authorized the authentication server 101 and/or the web server 107 to share data and/or information about the users 125a, 125b, 125c, 125n and/or client devices 115a, 115b, 115n with the relying party server 107. In one embodiment, the authentication server 101 only shares information with the relying party server 107 if the user 125a, 125b, 125c, 125n has provided permission to the authentication server 101 to do so. In another embodiment, the authentication server 101 only provides information to the relying party server 107 if the relying party server 107 is going to use the information in a way that the user has authorized. If the relying party server 107 is going to use the information in an unauthorized way, the authentication server 101 does not share information with the relying party server 107.

The client device 115a, 115b, 115n is any computing device. For example the client device 115a, 115b, 115n is a personal computer ("PC"), smart phone, tablet computer (or tablet PC), web-enabled television, settop box, etc. One having ordinary skill in the art will recognize that other types of client devices 115a, 115b, 115n are possible. In one embodiment, the system 100 comprises a combination of different types of client devices 115a, 115b, 115n. For example, a first client device 115a is a smart phone, a second client device 115b is a personal computer and a plurality of other client devices 115n is any combination of a personal computer, a smart phone and a tablet computer.

The client device 115a, 115b, 115n comprises a browser 177 and a cookie storage 171. Alternatively, the client device 115a, 115b, 115n also comprises an encryption module 173.

The browser 177 is code and routines stored in a memory (not pictured) and executed by a processor (not pictured) of the client device 115a, 115b, 115n. For example, the browser 177 is a browser application such as Google Chrome. The browser 177 comprises a cookie storage 171 for storing data. The cookie storage 171 is described above with reference to the authentication module 195. In one embodiment, the browser 177 comprises code and routines for determining whether cookie 103 is stored in the cookie storage 171 and including an indication of this condition in a communication set to the authentication server 101. For example, the browser 177 includes information in a set of login information (e.g., one or more bits of data) indicating that a cookie 103 is currently stored on the client device 115a.

In the depicted embodiment, the browser 177 stores the cookie 103. At different times, the cookie 103 is also stored in the storage device 141 and not in the cookie storage 171. The authentication module 195 retrieves the cookie 103 from the storage device 141 and sends the cookie 103 to browser 177 responsive to a login event. The cookie 103 is a text data received from the authentication module 195 following a login event and configured so that the client device 115a, 115b, 115n does not delete the cookie 103 responsive to a logout event. For example, the cookie 103 includes one or more bits of data indicating to the browser 177 that the cookie 103 should not be deleted. In one embodiment, the cookie 103 is configured so that it does not have an expiration date. In another embodiment, the browser 177 is configured not to delete the cookie 103.

The encryption module 173 is code and routines that, when executed by a processor (not pictured), encrypts the cookie 103. For example, the encryption module 173 encrypts the cookie 103 before it is shared with the relying party server 107. In one embodiment, the authentication server 101 is trusted by the client 115a, 115b, 115n and the storage device 141 stores a key for decrypting the cookie 103. The encryption module 173 is stored on a memory (not pictured) associated with the client 115a, 115b, 115n. The user 125a, 125b, 125c, 125n is a human user of the client 115a, 115b, 115n.

Authentication Module

Figure 2:
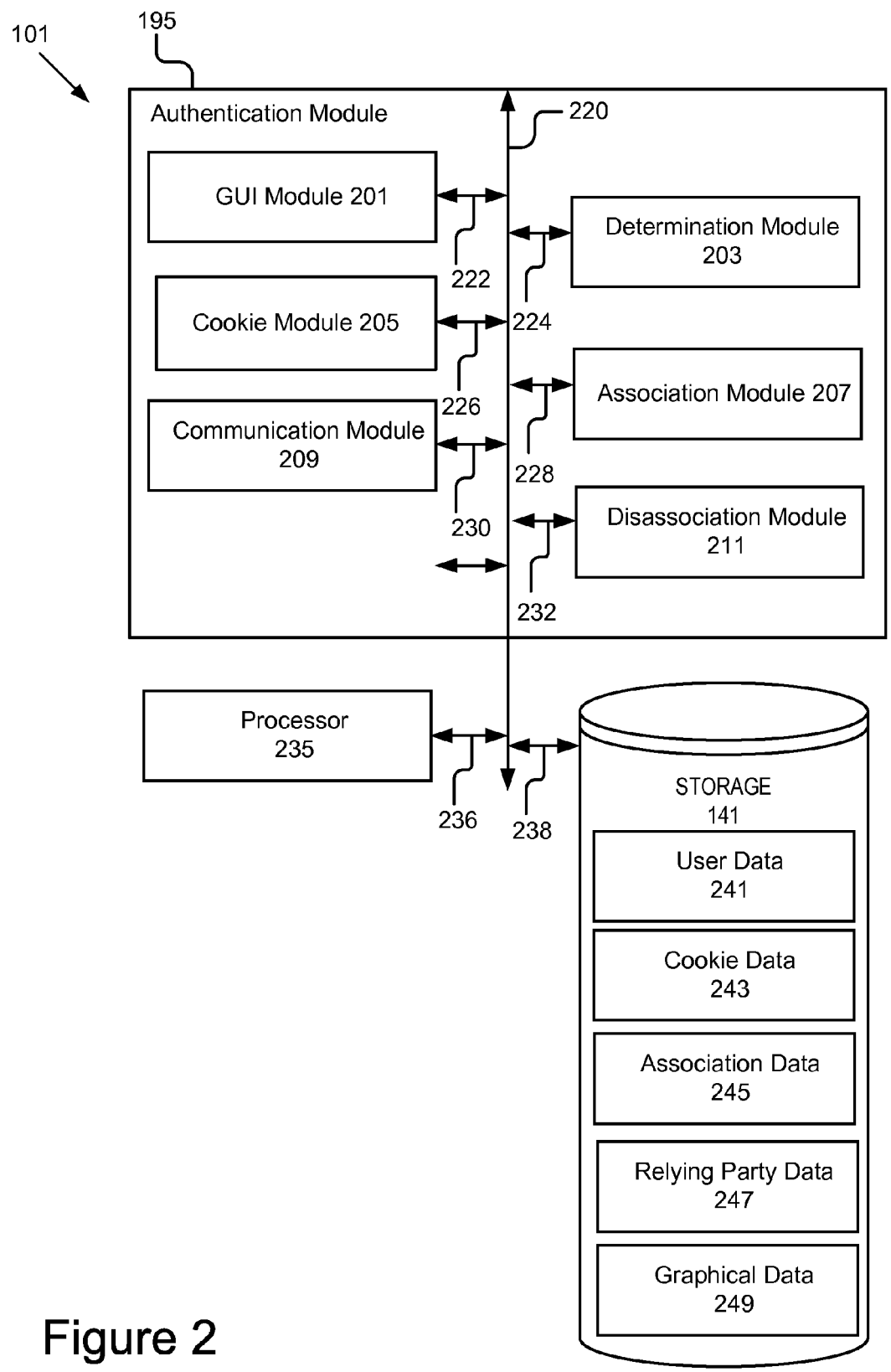
FIG. 2 is a block diagram illustrating one embodiment of an authentication module.

Referring now to FIG. 2, the authentication module 195 is shown in more detail. FIG. 2 is a block diagram of the authentication server 101 that includes the authentication module 195, a processor 235 and the storage device 141. The processor 235 comprises an arithmetic logic unit, a microprocessor, a general purpose controller or some other processor array to perform computations, retrieve data stored on the storage device 141, etc. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor 235 is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The storage device 141 stores instructions and/or data that may be executed by the processor 235. The storage device 141 is communicatively coupled by the bus 220 for communication with the other components of the authentication server 101. In one embodiment, the instructions and/or data comprises code for performing any and/or all of the techniques described herein. The storage device 141 is communicatively coupled to the bus 220 via signal line 238. In the depicted embodiment, the storage device 141 stores user data 241, cookie data 243, association data 245, relying party data 247 and graphical data 249. In one embodiment, the storage device 141 stores a key used by the communication module 209 to decrypt an encrypted cookie such as cookie 103 after being encrypted by encryption module 173.

The user data 241 is data collected by the authentication module 195 when a user 125a, 125b, 125c, 125n registers with the authentication service provided by the authentication server 101. For example, the user data 241 includes the registration information for the user 125a, 125b, 125c, 125n. In one embodiment, the registration information includes a combination of a user name, a password and a device identifier. In another embodiment, the authentication service includes managing the online identity of the user 125a, 125b, 125c, 125n. For example, the user data 241 is data collected by the authentication module 195 when a user 125a, 125b, 125c, 125n registers for a Google® FriendConnect account with the authentication server 101. In one embodiment, the user 125a, 125b, 125c, 125n having an active Google® FriendConnect account configures the Google® FriendConnect account to act as the user's 125a, 125b, 125c, 125n online identity according to the OpenID® standard.

The relying party data 247 is data collected by the authentication module 195 when an administrator (not pictured) of the relying party server 107 registers the relying party server 107 and/or a website hosted by the relying party server 107 (represented by service module 191 in FIG. 1) with the authentication service provided by the authentication server 101. For example, the authentication server 101 is an OpenID® provider and the relying party data 247 includes data collected when the administrator of the relying party server 107 registers the relying party server 107 and/or a website hosted by the relying party server 107 with the authentication module 195 as a relying party according to the OpenID® standard.

The cookie data 243 are stored cookies (such as cookie 103 when stored on the authentication server 101) and data used to generate cookies such as cookie 103.

The association data 245 is data describing an association between a device identifier and one or more of the users 125a, 125b, 125c, 125n. For example, the association data 245 includes a user identifier associated with a user 125a, 125b, 125c, 125n and a user identifier. In one embodiment, this association between the device identifier and the user identifier is used to track the user's 125a, 125b, 125c, 125n activities across one or more websites (with the user's permission). In one embodiment, the association data 245 includes an indication of whether the user 125a, 125b, 125c, 125n has given permission to track the user's 125a, 125b, 125c, 125n activities and the tracking only occurs with the user's 125a, 125b, 125c, 125n permission. In another embodiment, the association data 245 is data describing an association between a cookie (such as cookie 103) and one or more of the users 125a, 125b, 125c, 125n.

The graphical data 249 are data used to generate graphics for a website and/or one or more graphical user interfaces. For example, the graphical data 249 includes data to generate a graphical user interface used by a user 125a, 125b, 125c, 125n to enter login information or to logout of the authentication server 101.

The authentication module 195 comprises a Graphical User Interface ("GUI") module 201, a determination module 203, a cookie module 205, an association module 207, a communication module 209 and a disassociation module 211.

The communication module 209 is code and routines that, when executed by the processor 235, causes the communication module 209 to communicate with other devices via the network 105. The authentication module 195 communicates with other devices via the communication module 209. For example, the communication module 209 communicates with the relying party server 107 and/or the client device 115a, 115b, 115n via the network 105. The communication module 209 sends data to those devices 107, 115a, 115b, 115n and receives data and/or information from these devices 107, 115a, 115b, 115n via the network 105. In the depicted embodiment, the communication module 209 communicates with the other components of the authentication server 101 via the bus 220 and the signal line 230. In one embodiment, the communication module 209 includes code and routines for receiving an encrypted cookie 103 from the relying party server 107 and decrypting the cookie 103.

The GUI module 201 is code and routines that, when executed by the processor 235, retrieves a set of graphical data 249 from the storage device 141 and generates a graphical user interface ("GUI") used by a user 125a, 125b, 125c, 125n. In one embodiment, the GUI module 201 generates a login GUI used by the user 125a, 125b, 125c, 125n to provide login information to the authentication module 195 (i.e., "a login event") and a logout GUI used by the user 125a, 125b, 125c, 125n to provide an input indicating that the user 125a, 125b, 125c, 125n desires to logout (i.e., "a logout event"). The login information includes an indication of whether the client device 115a, 115b, 115n currently has stored on the client device 115a, 115b, 115n a cookie issued by the authentication server 101. For example, the GUI module 201 communicates with the browser 177 to receive an indication from the browser 177 about whether the client device 115a, 115b, 115n is currently storing a cookie issued by the authentication module 195. The GUI module 201 receives the login information and communicates the login information to the determination module 203 via the bus 220 and signal line 222. In one embodiment, the GUI module 201 retreives registration information from the user data 241 and compares the login information to the registration information to determine if the user 125a, 125b, 125c, 125n has provided valid login information. For example, the username and password provided by the user 125a, 125b, 125c, 125n matches registration information stored in the user data 241. In another embodiment, the function of determining whether a user 125a, 125b, 125c, 125n has provided valid login information is performed by the determination module 203.

In one embodiment, the cookie module 205 generates a new cookie each time the user provides login information. In another embodiment, if the login information includes an indication that the client device 115a, 115b, 115n currently has a cookie issued by the authentication server 101 stored on the client device 115a, 115b, 115n, the GUI module 201 signals the cookie module 205 to indicate this condition to the cookie module 205 and the cookie module 205 does not generate a new cookie to be issued to the client device 115a, 115b, 115n. In one embodiment, the GUI module 201 also signals one or more of the determination module 203 and the association module 207 to indicate that the client device 115a, 115b, 115n currently has a stored cookie issued by the authentication server 101. In one embodiment, the functionality described in this paragraph is performed by the determination module 203 as described below.

The determination module 203 is code and routines that, when executed by the processor 235, receives the login information from the GUI module 201 via the bus 220 and signal line 224 and, based at least in part on the login information, determines a user identifier for the user 125a, 125b, 125c, 125n that provided the login information and a device identifier. In one embodiment, determining a user identifier includes accessing the user data 241 to determine whether the user 125a, 125b, 125c, 125n provided valid login information by comparison to the stored registration information. The user identifier is unique data that identifies a particular user 125a, 125b, 125c, 125n. The device identifier is unique data that identifies a particular client device 115a, 115b, 115n. In one embodiment, the determination module 203 stores the user identifier and the device identifier in a memory associated with the authentication server 101 such as the storage device 141. For example, the determination module 203 stores the user identifier and the device identifier in the user data 241. In another embodiment, the determination module 203 signals the cookie module 205 via the bus 220 and the signal line 224 when in the process of determining whether a user identifier and a device identifier is complete. In yet another embodiment, the determination module 203 sends the user identifier and the device identifier to the cookie module 205 via the bus 220 and the signal line 224.

In one embodiment, the determination module 203 determines whether a cookie is stored on the client device 115a, 115b, 115n and signals the cookie module 205 to indicate this condition to the cookie module 205 and the cookie module 205 does not generate a new cookie to be issued to the client device 115a, 115b, 115n. In one embodiment, the determination module 203 also signals the association module 207 to indicate that the client device 115a, 115b, 115n currently has a stored cookie issued by the authentication server 101.

The cookie module 205 is code and routines that, when executed by the processor 235, generates a cookie (e.g., cookie 103). The cookie is text data containing one or more bits of information. In one embodiment, the cookie is predetermined and stored in the cookie data 243. In another embodiment, the cookie module 205 generates a cookie responsive to the determination module 203 determining a user identifier and a device identifier and then the cookie module 205 stores the cookie in a memory associated with the authentication server 101 such as the storage device 141. For example, the determination module 203 stores the device identifier and the user identifier in the user data 241. In one embodiment, the cookie is text data that is concatenated with the user identifier received from the determination module 203. For example, the determination module 203 communicates the user identifier and the device identifier to the cookie module 205 via the bus 220 and the signal line 224 and the cookie module 205 concatenates the device identifier and the user identifier with the text data of the cookie so that the cookie includes the device identifier and the user identifier. In one embodiment, the determination module 203 signals the cookie module 205 via the bus 220 and signal line 224 when the process of determining a device identifier and a user identifier is complete. In one embodiment, the cookie module 205 signals the association module 207 via the bus 220 and signal line 226 when generation of the cookie is complete.

In one embodiment, the cookie module 205 generates a cookie for each login session that includes the same device identifier. In another embodiment, the cookie module 205 receives a signal from the GUI module 201 indicating that the client device 115a, 115b, 115n currently has a cookie issued by the authentication server 101 stored on the client device 115a, 115b, 115n, and the cookie module 205 does not generate a second cookie for the client device 115a, 115b, 115n. Instead, the GUI module 201 signals the cookie module 205 to indicate this condition to the cookie module 205 so that the cookie module 205 does not generate a new cookie to be issued to the client device 115a, 115b, 115n.

The association module 207 is code and routines that, when executed by the processor 235, associates a user identifier with a cookie. In one embodiment, the association module 207 stores data in the association data 245 that associates the user identifier with the cookie. The association is data stored in the association data 245 that indicates that a particular cookie is associated with a particular user 125a, 125b, 125c, 125n of a client device 115a, 115b, 115n.

In one embodiment, the association module 207 associates the device identifier with a user identifier. For example, the association module 207 stores data to the association data 245 that associates a first user identifier for a first user 125a with the device identifier for the client 115a used by the first user 125a. After a period of time (e.g., following a logout event for the first user 125a), the association module 207 stores data to the association data 245 that associates a second user identifier for a second user 125c with the same device identifier for the client 115a used by the second user 125c. In other words, the cookie 103 repeatedly includes the same device identifier even though the user 125a, 125c of the client 115a changes. In this way the association stored by the association module 207 attaches the device identifier to the user 125a, 125c.

In one embodiment, the association module 207 receives a signal from the cookie module 205 when the cookie generation is complete and the association module 207 stores data in the association data 245 that associates the device identifier with the user identifier. In another embodiment, the association module 207 receives a signal from the GUI module 201 indicating that the client device 115a, 115b, 115n already has a stored cookie. The determination module 203 determines a user identifier for the user 125a, 125b, 125c, 125n of the client device 115a, 115b, 115n and the association module 207 stores data in the association data 245 that associates the user identifier with the device identifier.

The disassociation module 211 is code and routines that, when executed by the processor 235, disassociates a user identifier with a device identifier. For example (with reference to FIG. 1), assume that a first user 125a of the client device 115a is associated with the device identifier and that this association is stored in the association data 245. The first user 125a of the client device 115a uses the browser 177 to access a logout screen generated by the GUI module 201. The first user 125a clicks a graphic indicating that the user 125a desires to logout (i.e., a logout event). Turning back to FIG. 2, the GUI module 201 communicates the logout event to the disassociation module 211 via the bus 220 and signal line 222. The disassociation module 211 retrieves data from the association data 245. The disassociation module 211 stores data in the association data 245 disassociating the first user 125a and the device identifier. Referring back to FIG. 1, assume the second user 125c desires to log in using the client device 115a. The second user 125c uses the browser 177 to access a login screen generated by the GUI module 201. The second user 125c uses the browser 177 to enter login information. The determination module 203 generates a new user identifier for the second user 125c. The cookie module 205 generates a new cookie that includes the same device identifier.

In one embodiment, the authentication module 195 includes code and routines that, when executed by the processor 235, anonymizes user data. For example, the authentication module 195 anonymizes a user identifier prior to storing the user identifier in the user data 241 so that the user identifier cannot be connected with a user's 125a, 125b, 125c, 125n identity.

Client 115a, 115b, 115n

Figure 3:
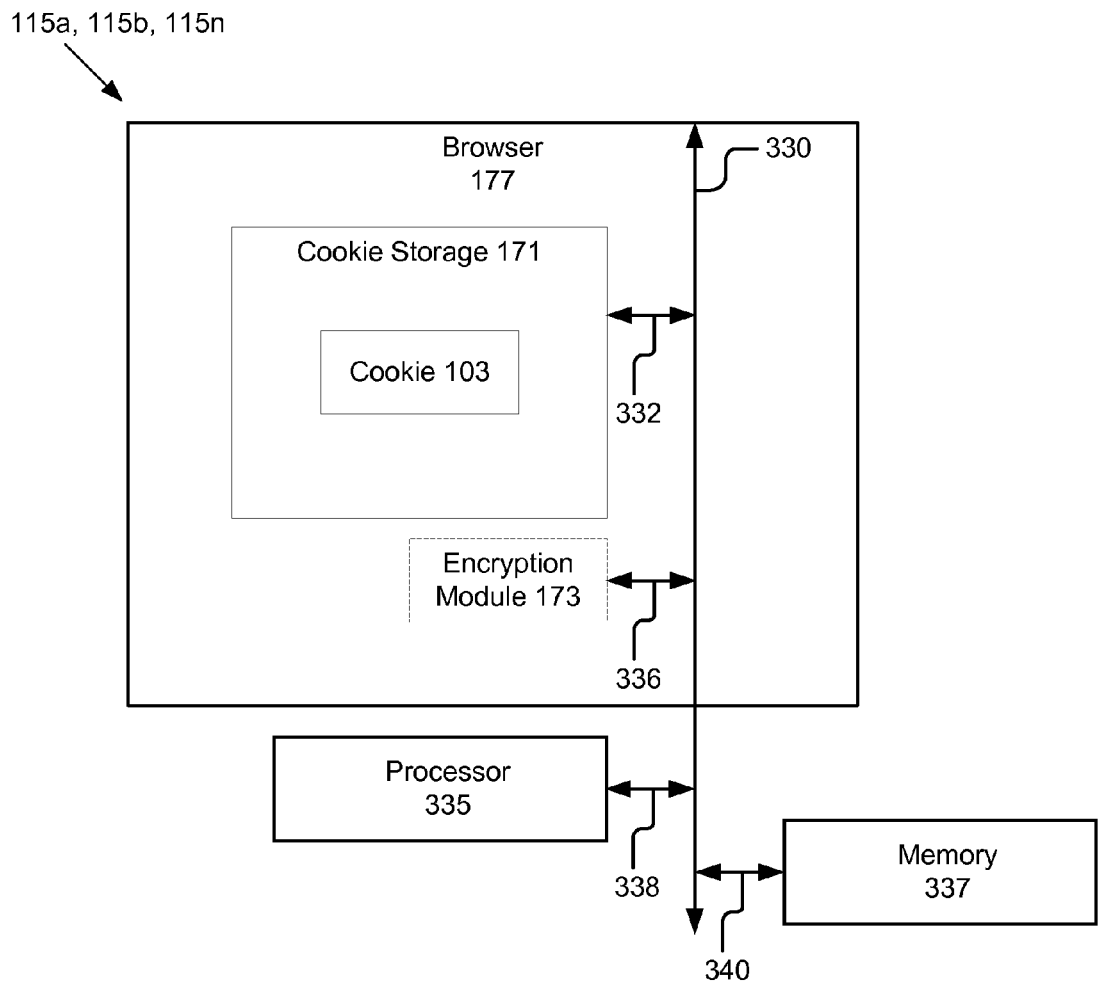
FIG. 3 is a block diagram illustrating one embodiment of a browser.

Referring now to FIG. 3, the browser 177 is shown in more detail. FIG. 3 is a block diagram of a client device 115a, 115b, 115n that includes the browser 177, the processor 335 and a memory 337. The processor 335 comprises an arithmetic logic unit, a microprocessor, a general purpose controller or some other processor array to perform computations, execute the browser 177, etc. The processor 335 is coupled to the bus 330 for communication with the other components. The processor 335 is communicatively coupled to the bus 320 via signal line 338. The processor 335 of the client device 115a, 115b, 115n includes other features similar to the processor 235 described above for the authentication server 101 (shown in FIG. 2), so that description will not be repeated here.

The memory 337 stores instructions and/or data that may be executed by the processor 235. The memory 337 is communicatively coupled by the bus 330 for communication with the other components of client device 115a, 115b, 115n. In one embodiment, the memory stores one or more of: the browser 177; the cookie storage 171; the cookie 103; and the encryption module 173. The memory 337 is a dynamic random access memory (DRAM) device, a static random access memory (SRAM) device, flash memory or some other memory device known in the art. In one embodiment, the memory 337 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The memory 337 is communicatively coupled to the bus 330 via signal line 340.

The browser 177 comprises a cookie storage 171 and a cookie 103. The cookie storage 171 is communicatively coupled to the bus 330 via signal line 332 to communicate with the other components of the client 115a, 115b, 115n. The browser 177 communicates with the relying party server 107 and the authentication server 101 via the network 105. The browser 177 sends data to these devices 107, 101 and receives data and/or information from these devices 107, 101 via the network 105. The browser 177 also computes Universal Resource Locators ("URL" if singular or "URLs" if plural) for communicating with these devices 107, 101. The browser 177 receives the cookie 103 from the authentication module 195 via the network 105. The browser 177 stores the cookie 103 on the cookie storage 171. The cookie storage 171 and the cookie 103 are described above with reference to FIGS. 1 and 2, and so, these descriptions will not be repeated here.

In one embodiment, the browser 177 comprises an encryption module 173. The encryption module 173 is communicatively coupled to the bus 330 via signal line 336. The encryption module 173 communicates with the other components of the client 115a, 115b, 115n via the bus 330. The encryption module 173 is described above with reference to FIG. 1, so that description will not be repeated here.

Signal Diagram

Figure 4:
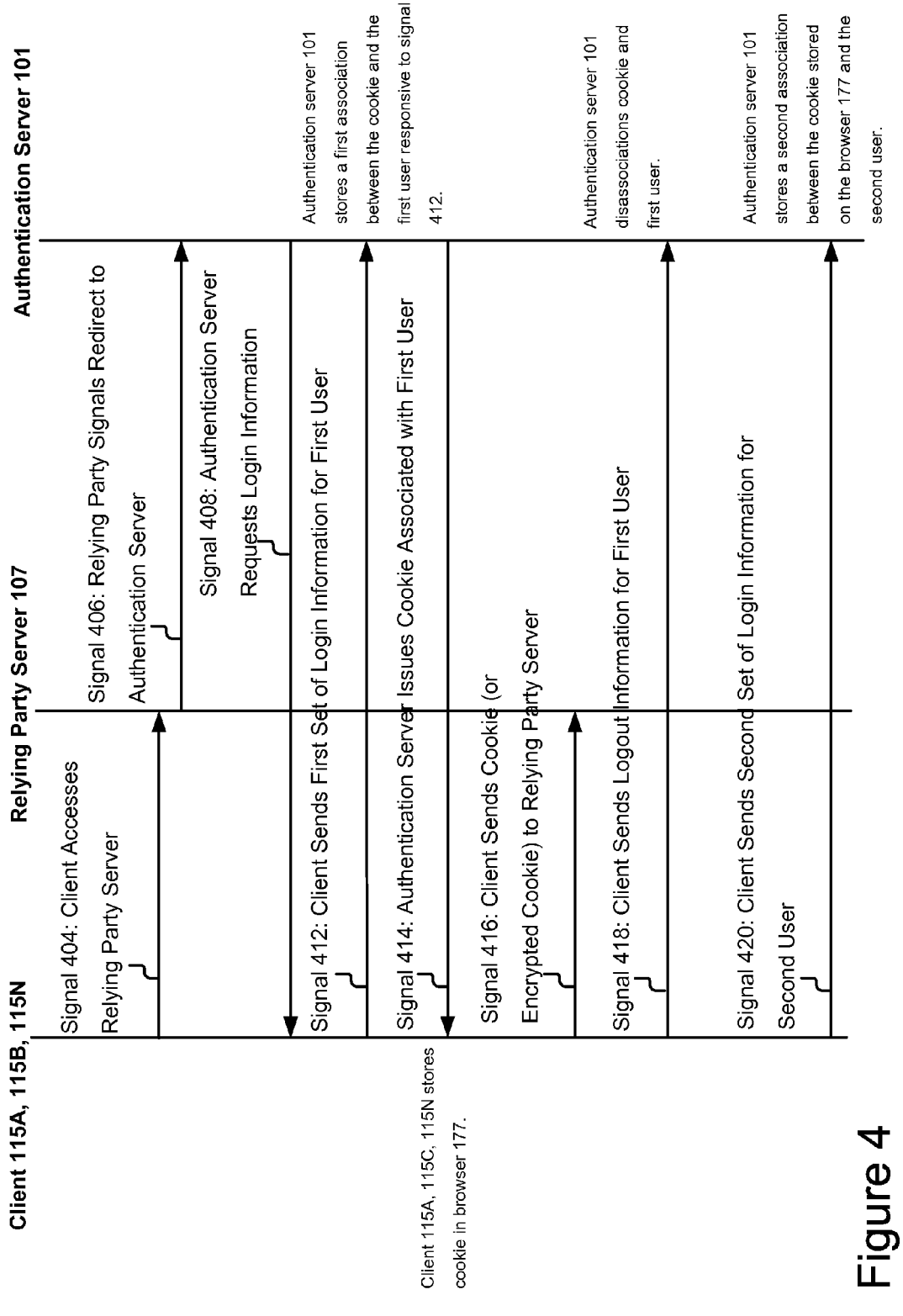
FIG. 4 is a diagram illustrating a method for authenticating a user with a cookie according to one embodiment.

Referring now to FIG. 4, depicted is a diagram illustrating an alternate method for authenticating a user 125a, 125b, 125*c*, 125*n* of a client 115*a*, 115*b*, 115*n* with a cookie 103 according to one embodiment. The first user 125*a* of the client 115*a* desires to access the relying party server 107 using the browser 177 stored on the client 115*a*. The client 115*a* accesses the relying party server 107 by transmitting a signal 404 to the relying party server 107. The relying party server 107 redirects the client 115*a* to the authentication server 101 by transmitting a signal 406. For example, the relying party server 107 displays a login page for the client 115*a*. The first user 125*a* of the client selects a graphic indicating that the first user 125*a* desires to login using an identity managed by the authentication server 101. The relying party server 107 receives the input from the browser 177 operable on the client 115*a* and redirects the client 115*a* to a login page hosted by the authentication server 101.

The authentication server 101 requests login information from the first user 125*a* by transmitting signal 408. The client 115*a* sends the login information for the first user 125*a* by transmitting signal 412. The authentication server 101 generates a cookie 103 and stores a first association between the first user 125*a* and the cookie 103. The authentication server 101 issues the cookie 103 to the client 115*a* by transmitting signal 414. For example, the authentication server 101 issues the cookie 103 depicted in FIG. 1 and FIG. 3. The cookie 103 is associated with the first user 125*a*. The client 115*a* stores the cookie 103 on the browser 177. In one embodiment, the authentication server 101 redirects the client 115*a* to the relying party server 107. The client 115*a* sends the cookie 103 to the relying party server 107 by transmitting a signal 416. In one embodiment, the cookie 103 is encrypted. The relying party server 107 receives the cookie 103. In one embodiment, the cookie 103 includes a concatenated user identifier that authenticates the first user 125*a* to the relying party server 107. If the cookie 103 is encrypted, the relying party server 107 sends the cookie 103 to the authentication server 101 and the authentication server 101 decrypts the cookie 103 and authenticates the first user 125*a* to the relying party server 107. In one embodiment, the authentication server 101 does not reveal information about the client 115*a* or the first user 125*a* to the relying party server 107. For example, the authentication server 101 does not reveal the login information for the first user 125*a* or other identifying information of the first user 125*a* to the relying party server 107.

After a first period of time, the first user 125*a* uses the client 115*a* to send logout information to the authentication server 101 via signal 418. For example, the authentication server 101 displays a logout page for the client 115*a* that includes a graphic selected by the first user 125*a* to indicate that the first user 125*a* desires to logout. In one embodiment, the logout page is hosted and displayed by the relying party server 107 and the relying party server 107 relays the logout information to the authentication server 101. The authentication server 101 receives the logout information and disassociates the cookie 103 (now stored on the client 115*a*) and the first user 125*a*. The cookie 103 is not deleted from the client 115*a* responsive to the first user logging out.

After a second period of time, a second user 125*c* of the client 115*a* desires to login to the authentication server 101 via signal 420. The second user 125*c* of the client 115*a* uses the client 115*a* to send a second set of login information to the authentication server 101. The second set of login information includes an indication that the client 115*a* has the cookie 103 stored on the client 115*a*. The authentication server 101 does not generate a new cookie for the client 115*a*, and stores a second association between the cookie 103 already stored on the client 115*a* and the second user 125*c*.

Methods

Figure 5:
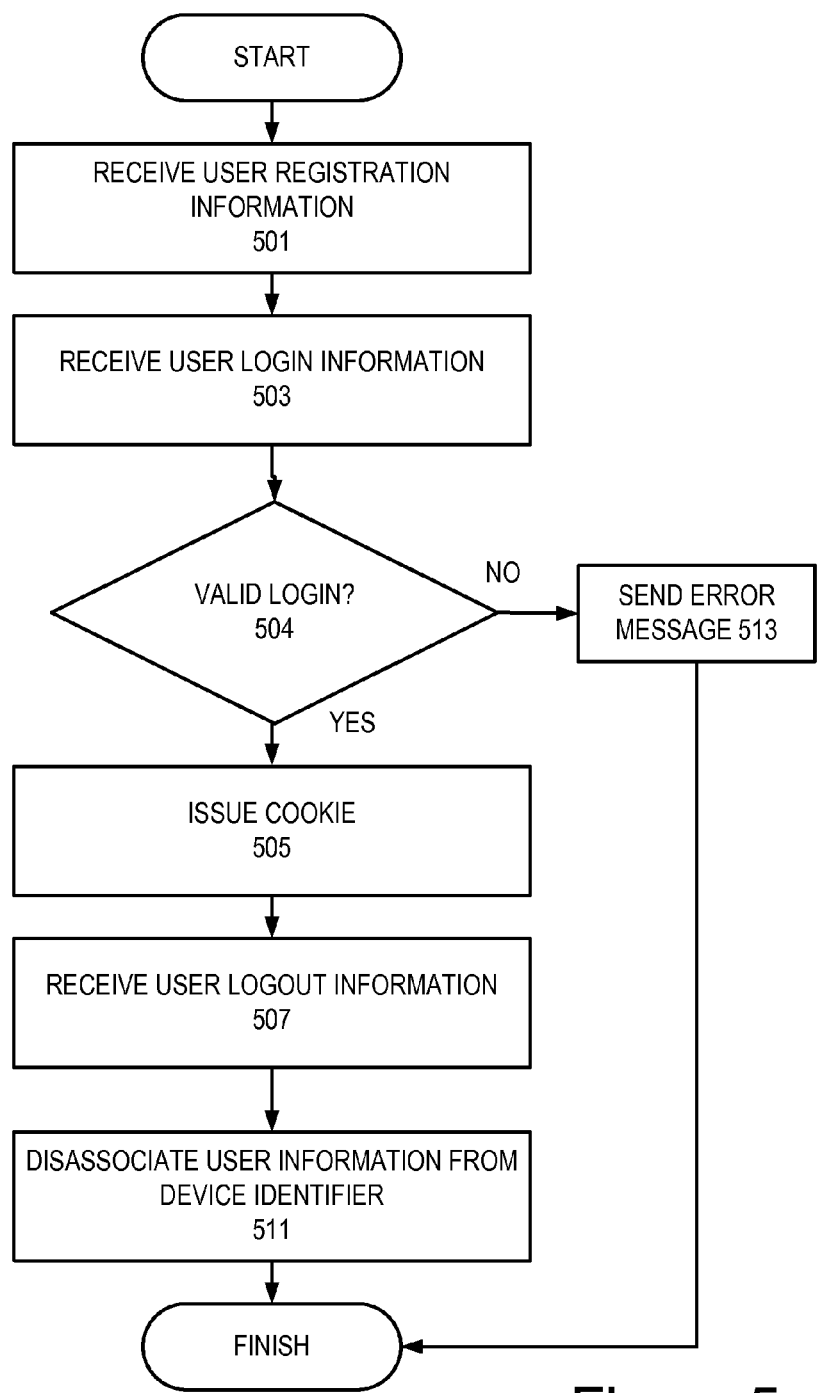
FIG. 5 is a flow diagram of one embodiment of a method for authenticating a user with a cookie.

Referring to FIG. 5, depicted is a flow diagram of a method 500 for authenticating a user 125*a*, 125*b*, 125*c*, 125*n* with a cookie 103 according to one embodiment. The authentication module 195 receives 501 user registration information for a first user 125*a* and a second user 125*c*. After a period of time, the authentication module 195 receives 503 user login information for the first user 125*a*. The authentication module 195 compares 504 the login information to the registration information to determine if the first user 125*a* has provided valid information. If the login information is not valid, the authentication module 195 sends 513 an error message to the client 115*a*. If the login information is valid, the method 500 moves to step 505 and the authentication module 195 issues 505 a cookie 103 to the client 115*a*. After a period of time the first user 125*a* decides to logout. The authentication module 195 receives 507 logout information from the first client 115*a* for the first user 125*a*. The authentication module 195 disassociates 511 user information from a device identifier and the method ends.

Figure 6A:
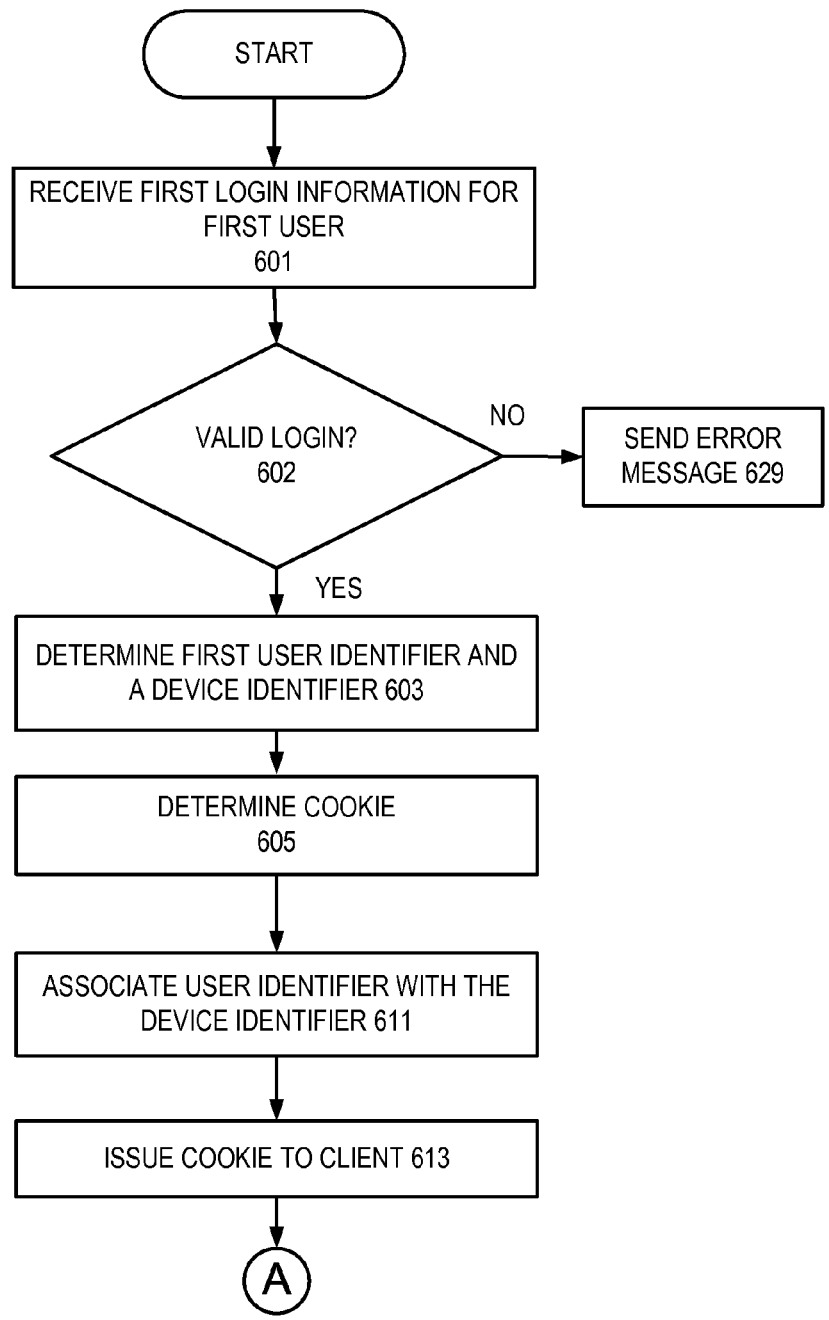
FIGS. 6A and 6B are a flow diagram of another embodiment of a method for authenticating a user with a cookie.
Figure 6B:
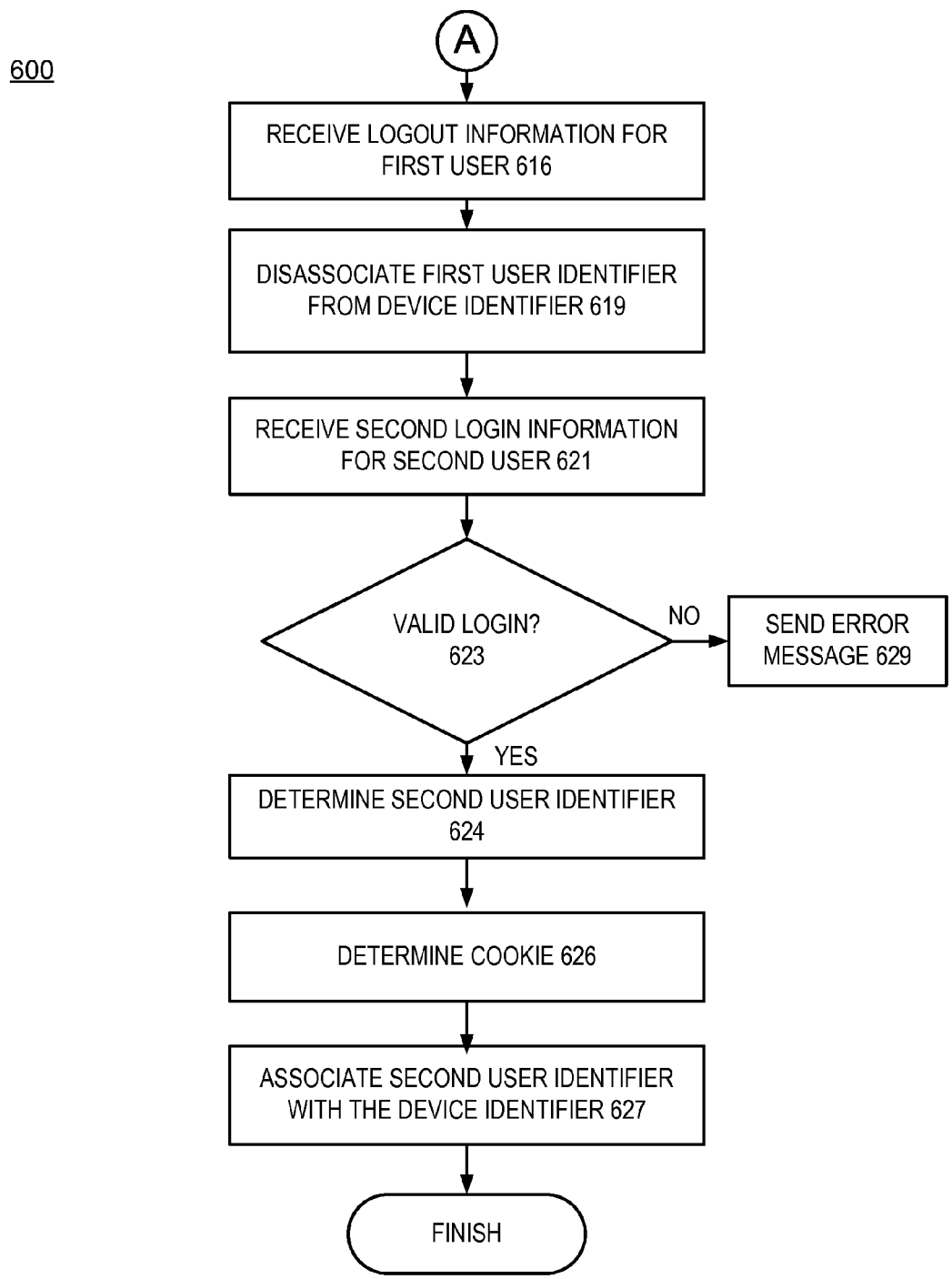

Referring to FIGS. 6A and 6B, depicted is a flow diagram of a method 600 for authenticating a user 125*a*, 125*b*, 125*c*, 125*n* with a cookie according to one embodiment. In this example, the client 115*a* is used at different times by the first user 125*a* and the second user 125*c*. At step 601, the GUI module 201 receives first login information for first user 125*a*. In one embodiment, the GUI module 201 passes the login information to the determination module 203. At step 602 the GUI module 201 determines whether the login information is valid. If the login information is not valid, the GUI module 201 signals this result to the communication module 209 and the communication module 209 sends 629 an error message to the client 115*a*. If the login information is valid, the method 600 moves to step 603.

At step 603 the determination module 203 determines a first user identifier for the first user 125*a* and a device identifier for the client 115*a*. In one embodiment, the determination module 203 communicates with the storage 141 to store the user identifier and the device identifier in the user data 241.

At step 605, the cookie module 205 determines a cookie. For example, the cookie module 205 retrieves a predetermined cookie from the cookie data 243. In another embodiment, the cookie data 243 stores data used by the cookie module 205 to determine a cookie by generating the cookie and the cookie module 205 generates the cookie based at least in part on the cookie 243. The cookie includes the device identifier. At step 611, the association module 207 associates the first user identifier with the device identifier. The association module 207 stores this association in the association data 245. At step 613, the communication module 209 issues the cookie to the client 115*a*. The client 115*a* stores the cookie in the cookie storage 171. At step 616, the GUI module 201 receives 616 logout information for first user 125*a*. At step 619, the disassociation module 211 disassociates the first user identifier from the device identifier.

At step 621, the GUI module 201 receives second login information for second user 125*c*. At step 623, the GUI module 201 determines whether the login information is valid. If the login information is not valid, the GUI module 201 signals this result to the communication module 209 and the communication module 209 sends 629 an error message to the client 115*a*. If the login information is valid, the method 600 moves to step 624.

At step 624, the determination module 203 determines a second user identifier for the second user 125*c*.

At step 626 the cookie module 205 determines a cookie similar to step 605. At step 627, the association module 207 associates a user identifier with a cookie. The association module 207 associates 627 the second user identifier with the device identifier.

The foregoing description of the example embodiments has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for cookie association, the method comprising:
   generating a cookie to include a device identifier that identifies a client;
   generating, with one or more processors, association data that associates a first user identifier for a first user with the device identifier;
   issuing the cookie to the client;
   receiving logout information from the client for the first user;
   disassociating, with the one or more processors, the first user identifier from the device identifier;
   receiving login information from a second user of the client including an indication that the client has the cookie; and
   updating the association data to associate a second user identifier for the second user with the device identifier included in the cookie.

2. The method of claim 1, wherein the cookie has no expiration date.

3. The method of claim 2, further comprising storing the cookie in the client.

4. The method of claim 1, further comprising:
   encrypting the cookie.

5. The method of claim 1 further comprising registering the first user.

6. The method of claim 5, further comprising identifying the device identifier during the registration.

7. The method of claim 5, further comprising identifying the first user identifier during the registration.

8. The method of claim 1, further comprising:
   receiving the cookie from a relying party server; and
   decrypting the cookie.

9. A computer program product for cookie association comprising a non-transitory computer readable medium storing a computer readable program, wherein the computer readable program when executed on a computer causes the computer to perform steps comprising:
   generating a cookie to include a device identifier that identifies a client;
   generating association data that associates a first user identifier for a first user with the device identifier;
   issuing the cookie to the client;
   receiving logout information from the client for the first user;
   disassociating the first user identifier from the device identifier;
   receiving login information from a second user of the client including an indication that the client has the cookie; and
   updating the association data to associate a second user identifier for the second user with the device identifier included in the cookie.

10. The computer program product of claim 9, wherein the cookie has no expiration date.

11. The computer program product of claim 9, wherein the computer readable program causes the computer to perform further steps comprising:
    storing the cookie in the client.

12. The computer program product of claim 9, wherein the computer readable program causes the computer to perform further steps comprising encrypting the cookie.

13. The computer program product of claim 9, wherein the computer readable program causes the computer to perform further steps comprising registering the first user.

14. The computer program product of claim 13 wherein the computer readable program causes the computer to perform further steps comprising identifying the device identifier during the registration.

15. A system for cookie association, the system comprising:
    one or more processors;
    a graphical user interface module stored on a memory and executable by the one or more processors, the graphical user interface module communicatively coupled to receive a first set of login information from a client at a first time, logout information from the client at a second time and a second set of login information including an indication that the client has a cookie at a third time;
    a determination module stored on the memory and executable by the one or more processors, the determination module communicatively coupled to the graphical user interface module to receive at least a first portion of the first set of login information and at least a second portion of the second set of login information, the determination module configured to determine a first user identifier for the first set of login information, a second user identifier for the second set of login information and a device identifier that identifies the client;
    a cookie module stored on the memory and executable by the one or more processors, the cookie module communicatively coupled to the determination module to generate the cookie to include the device identifier that identifies the client and issue the cookie to the client;
    an association module stored on the memory and executable by the one or more processors, the association module communicatively coupled to the determination module to receive at least the first portion of the first set of login information and at least the second portion of the second set of login information from the graphical user interface module and the cookie from the cookie module, the association module configured to generate association data that associates the first user identifier with the device identifier included in the cookie at the first time and update the association data to associate the second user identifier with the device identifier included in the cookie at the third time; and a disassociation module stored on the memory and executable by the one or more processors, the disassociation module communicatively coupled to the graphical user interface module to receive the logout information, the disassociation module configured to disassociate the first user identifier from the device identifier.

16. The system of claim 15, wherein the graphical user interface module receives registration information of a first user.

17. The system of claim 16, wherein the cookie is transferred to the client for storing.

18. The system of claim 15, further comprising an encryption module coupled to the cookie module to encrypt the cookie.

19. The system of claim 16, wherein the determination module compares the first set and the second set of login information to the registration information to determine whether the first set and the second set of login information are valid.

20. The system of claim 15, wherein the graphical user interface module identifies the device identifier during registration.

* * * * *